Aug. 31, 1937.          C. E. HAYS          2,091,813
ELECTRICAL TESTING APPARATUS
Filed July 9, 1934
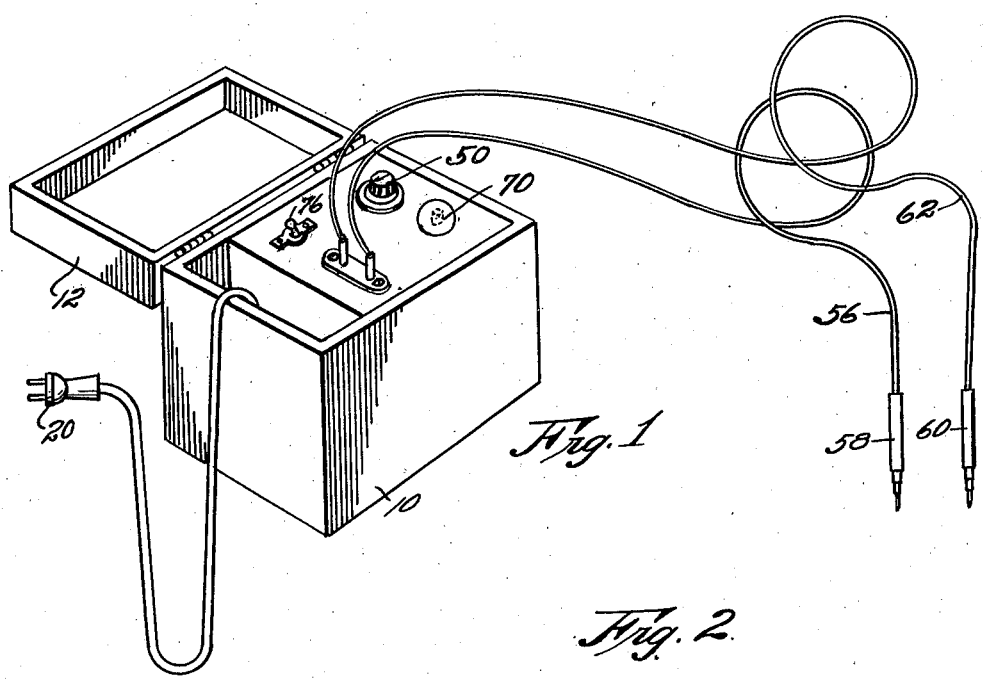
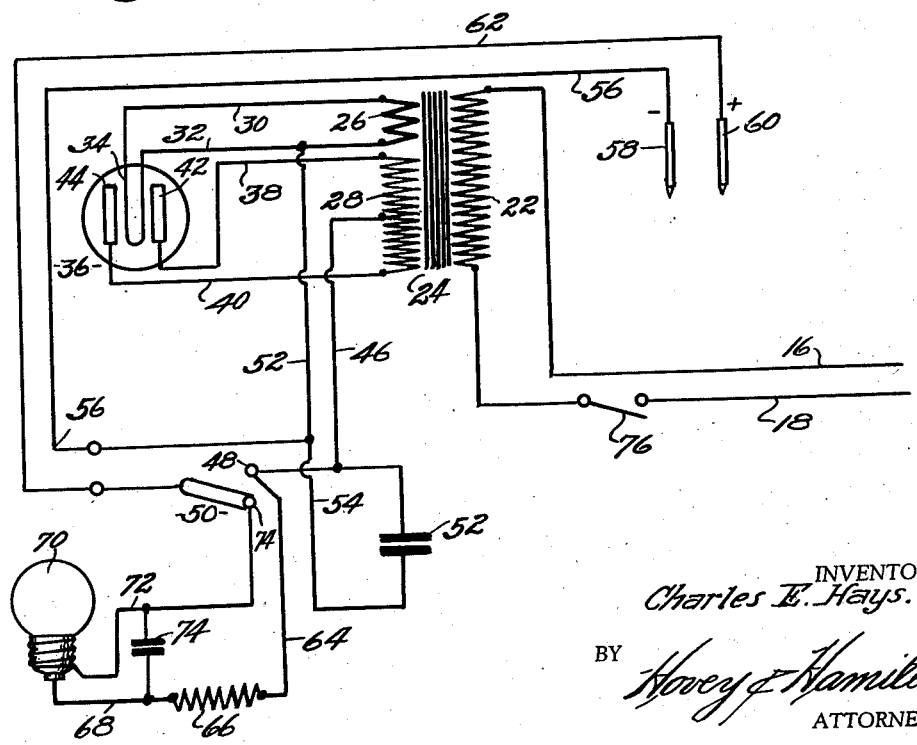
INVENTOR,
Charles E. Hays.
BY Hovey & Hamilton,
ATTORNEYS.

Patented Aug. 31, 1937

2,091,813

UNITED STATES PATENT OFFICE 2,091,813

ELECTRICAL TESTING APPARATUS

Charles E. Hays, Kansas City, Mo., assignor to John E. Trulson, Kansas City, Mo.

Application July 9, 1934, Serial No. 734,318

2 Claims. (Cl. 175—183)

This invention relates to electrical testing apparatus and particularly to an apparatus suitable for testing electrical equipment normally used in radios and automobiles to show weakness in insulation, high resistance, faulty connections, etc.

The principal object of this invention is the provision of an electrical testing apparatus operable from an alternating current source, which apparatus comprises a primary and a secondary circuit, said secondary circuit having full wave rectifying means and means whereby the voltage of the rectified current may be selectively charged to suit the requirements for different tests.

A further object of the present invention is the provision of an electrical testing apparatus operable from an alternating circuit source and adapted to retain sufficient electrical charge after disconnection from said electrical source, to permit certain tests to be made before recharging.

A still further object of the invention is the provision of an electrical testing apparatus adapted to detect faulty armatures in generator having a tendency to cut out at high speed, and one that may be manipulated to burn the dirt from between the stator plates of a variable condenser for radios when desirable.

Other objects are accuracy and ease of operation, and adaptability to different tests.

With these, as well as minor objects which will appear during the course of the specification in view, reference will now be had to the drawing, wherein:

Figure 1 is a perspective view of an electrical testing apparatus embodying this invention.

Fig. 2 is a diagrammatical view of the electrical circuit of the electrical testing apparatus.

In the drawing like reference characters refer to the same or similar parts and the numeral 10 indicates a cabinet having a hinged cover 12, and in which is mounted the electrical apparatus. This cabinet, together with the electrical parts, is of a suitable size and weight to allow its easy movement from place to place for general use about an automobile or radio service station. Certain parts of the electrical equipment are so positioned and constructed as to permit of proper manipulation of the apparatus, as will be hereinafter set forth.

Referring to Fig. 2, which is a typical circuit used in building a testing apparatus embodying the present invention, line wires 16 and 18 are provided with a suitable plug 20, by means of which the apparatus is connected with the usual 110 volt alternating current electrical service line. Wires 16 and 18 are connected to opposite ends respectively of the primary coil 22 of a transformer 24. The transformer 24 is provided with two secondary windings 26 and 28. The winding 26 is directly connected by wires 30 and 32 with the filament 34 of the thermionic full wave rectifier 36. The current induced in 26 is of relatively low voltage, usually above five volts. Winding 28 is connected at its opposite end with wires 38 and 40 which are connected respectively with plates 42 and 44 of tube 36. A lead wire 46 is connected with 28 centrally intermediate its ends and to one point 48 of the double switch 50, also it is connected to one side of the condenser 52. The opposite side of said condenser is connected through wire 54 to wire 32. The terminal wire 56 joins wire 52 and is provided with test prod 58. The other test prod 60 mounted on terminal wire 62 connects with 48 when switch 50 is contacting 48.

When switch 50 is in the position shown in Fig. 2, the current during testing passes from 48 through conductor 64, resistance 66, conductor 68, neon tube 70, conductor 72, to contact point 74 of switch 50. Condenser 74' is connected between conductors 68 and 72. A switch 76 is placed in the primary circuit to control the alternating current source.

While this apparatus is adapted for testing many different electrical devices, it is especially suited for testing condensers and for purpose of illustrating the use of this testing apparatus, a condenser will be considered. The primary circuit is first plugged into the usual 110 volt alternating current socket and switch 76 closed, thus causing said alternating current to pass through the primary coil 22 of transformer 24. With switch 50 in the position as shown in Fig. 2, the apparatus is now in condition for making certain visual tests which will be indicated by the glow of neon tube 70. When the test prods 58 and 60 are applied to the different poles of the condenser, a steady glow of the neon tube indicates a shorted condenser. An intermittent glowing of the neon tube indicates a leaky condenser. A single flash when the prods are first positioned without any further illumination of the tube indicates a good condenser. These different effects produced on the neon tube indicate very definitely the question of shorted, leaky and good condensers.

With the apparatus as shown and described, the device may be plugged into the alternating current supply, the plug 20 then removed, and the device operated to make the above described test without being connected to said current supply source. This is due to the stored up energy within the secondary circuit, which is sufficient to supply a proper amount of current to cause the neon tube to glow.

If the condenser is found to be in good condition, as indicated by the above test, switch 50 is thrown to contact point 48, thus eliminating the neon tube 70 from the secondary or testing circuit. When shunting across the condenser being tested, if the condenser is in good condition, one hot flash only will occur, but if the test leads are intermittently connected across the condenser and a flash is obtained each time such connection is made, or if a frying noise is obtained, the condenser is either shorted or leaking. It is apparent that the neon tube may be used for any continuity test, regardless of the type of electrical apparatus being tested. This device has been found very successful in detecting defective armatures in a generator which will cut out at high speed.

In view of the fact that this apparatus will remain electrically charged atfer being disconnected from the alternating current supply, it has been found very useful in serving cars and radios located away from any such electrical source.

Having thus described the invention, what is claimed as new and desired to be secured by Letters Patent is:

1. An electrical testing apparatus designed to be conditioned for use by a source of alternating current and for utilizing direct current in operation comprising, in combination, a transformer having a primary circuit adapted for connection with the source of alternating current; a secondary circuit having a low tension winding and a high tension winding, a thermionic full wave rectifier with its filament in connection with the said low tension winding, and the plates thereof in connection with the high tension winding, for rectifying the secondary circuit current, a neon lamp in series connection, a condenser in parallel and a resistance in series with the neon lamp whereby the voltage of the circuit to the lamp is reduced; a condenser in shunt circuit with said secondary circuit; a switch to optionally exclude said neon lamp from the secondary circuit; and test prods in connection with the secondary circuit, the electrical output therethrough being effected by the exclusion of the neon lamp from the secondary circuit, said secondary circuit parts serving to maintain sufficient potential to permit limited operation of the apparatus after the same is disconnected from the source of alternating current.

2. An electrical testing apparatus operable from an alternating current source comprising a transformer having a secondary circuit; a thermionic full wave rectifier in said secondary circuit whereby said secondary circuit is rectified; a condenser in shunt circuit with said secondary circuit; a resistance and a neon lamp in series in said secondary circuit; and a condenser in shunt circuit across the lamp terminals intermediate the lamp and the resistance.

CHARLES E. HAYS.